(12) United States Patent
Sharma

(10) Patent No.: US 6,287,200 B1
(45) Date of Patent: Sep. 11, 2001

(54) RELATIVE POSITIONING AND VIRTUAL OBJECTS FOR MOBILE DEVICES

(75) Inventor: Dipanshu Sharma, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/461,015

(22) Filed: Dec. 15, 1999

(51) Int. Cl.[7] .................................................. A63F 9/24
(52) U.S. Cl. .................................................. 463/40; 463/39
(58) Field of Search .................................. 463/30, 31, 39, 463/40, 42, 43, 44; 455/95, 151.2

(56) References Cited

U.S. PATENT DOCUMENTS

| | | | |
|---|---|---|---|
| 5,434,904 | * 7/1995 | Tsuzuki et al. | 379/58 |
| 5,738,583 | * 4/1998 | Comas et al. | 463/40 |
| 5,797,085 | * 8/1998 | Beuk et al. | 455/88 |
| 6,111,541 | * 8/2000 | Karmel | 342/357.13 |

* cited by examiner

Primary Examiner—Joe H.. Cheng
Assistant Examiner—Kim T. Nguyen
(74) Attorney, Agent, or Firm—Antonelli, Terry, Stout & Kraus, LLP

(57) ABSTRACT

Multiple participants can play a virtual game with each other utilizing respective mobile devices, regardless of location of the players. The virtual game can be implemented by a radio frequency protocol, such that the virtual game is played by multiple players determined to be within a radio frequency range of a requesting mobile device in accordance with a radio frequency protocol, or the virtual game can be implemented by a wireless application protocol (WAP) whereby the players can be located anywhere in the world.

26 Claims, 6 Drawing Sheets

RELATIVE POSITIONING AND VIRTUAL OBJECTS FOR MOBILE DEVICES

BACKGROUND

The present invention relates to a method and system for playing a virtual game with the participants, or players, of the game being located at random locations anywhere in the world. In particular, the present method and system utilize global positioning service (GPS) technology to either allow players located within a frequency range for a radio frequency protocol to play a virtual game utilizing mobile devices which communicate with each other in accordance with the radio frequency protocol or allow players located anywhere in the world to play the virtual game utilizing mobile devices which communicate with each other via a wireless application protocol (WAP).

GPS is a system for identifying earth locations, utilizing a triangulation of signals from three of 24 satellites originally launched by the U.S. Department of Defense. Accordingly, a receiving unit, including mobile devices, can pinpoint its current location anywhere on earth to within a few meters.

A system in which plural receivers transmit their GPS coordinates to a master station is disclosed in international patent application PCT/US97/01238.

Furthermore, virtual reality games are currently implemented by participants, or players, who utilize joysticks or other game devices in connection with a single processor. Thus, any participants of a virtual game must either have a respective joystick or other game device electronically connected to the processor or remain in an optical/infrared path of the processor to play the virtual reality game.

Currently, though, there is no means by which multiple participants are able to interact in a virtual reality setting utilizing respective mobile devices, regardless of whether or not any of the participants are electronically connected to a processor or within an optical/infrared path of the processor.

SUMMARY OF THE INVENTION

It is an object of the present invention to enable multiple participants, or players, to play a virtual game with each other, utilizing respective mobile devices. In is. 1particular, the virtual game can be implemented by a radio frequency protocol, such that the virtual game is played by multiple players who are determined to be within a common radio frequency range of a requesting mobile device in accordance with a radio frequency protocol, or the virtual game can be implemented by a wireless application protocol (NAP) data packet network whereby the players and their mobile devices can be located anywhere in the world.

BRIEF DESCRIPTION OF THE DRAWINGS

The scope of the present invention will be apparent from the following detailed description, when taken in conjunction with the accompanying drawings, and such detailed description, while indicating preferred embodiments of the invention, are given as illustrations only, since various changes and modifications within the spirit and scope of the invention will become apparent to those skilled in the art from this detailed description, in which.

DETAILED DESCRIPTION OF PREFERRED EMBODIMENT

According to the present invention, a virtual game can be played by multiple participants who have their own mobile device, regardless of the participants' locations. Explanation will be made by way of example, as described below.

In a first embodiment, the participants are able to play a virtual reality game utilizing a radio frequency protocol, including, but not limited to Bluetooth protocol. The active participants in the virtual reality game are defined by the frequency range of the radio frequency protocol, such as the 1m to 10m range implemented by the Bluetooth protocol.

Figure 1:
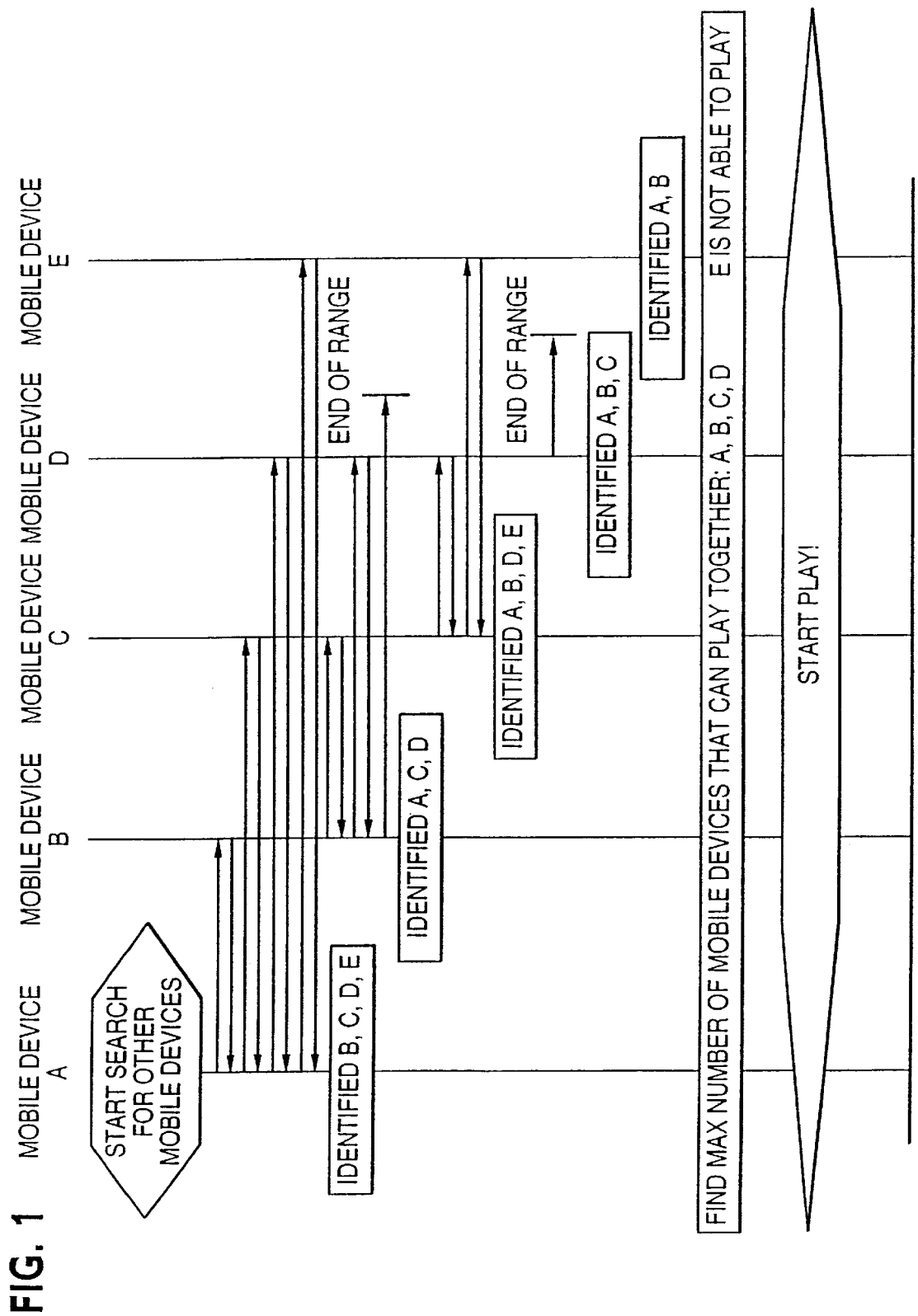
FIG. 1 shows the handshaking processing performed by potentially participating mobile devices in a virtual game implemented by a radio frequency protocol.

To start off a virtual reality game (hereinafter "virtual game"), the initiating participant having mobile device A initiates handshaking with other potential virtual game participants within the radio frequency protocol range of the requesting mobile device, which are the potential participants B through E in the present example. Handshaking signals are signals that are transmitted back and forth over a communications network to establish a valid connection between two stations. So, as seen in FIG. 1, handshaking signals are sent back and forth between the requesting mobile device A and requested mobile devices B through E which are within the radio frequency protocol range of mobile device A. The handshaking between requesting mobile device A and requested mobile devices B through E is completed when each of the requested mobile devices transmit a participation acknowledgment signal, indicating a desire to participate in the virtual game, and the GPS coordinates of the respective mobile devices. As a result of receiving the participation acknowledgment signals and the GPS coordinates of the respective mobile devices, User A is able to calculate the relative positions of all of the requested mobile devices B through E.

In the course of handshaking with requesting mobile device A, mobile devices B through E have received data indicating the identity of the remaining requested mobile devices. Thus, mobile devices B through E also engage in handshaking with the remainder of the respective mobile devices, as shown in FIG. 1, to determine the relative positions of the respective mobile devices.

However, as seen in FIG. 1, not all of the mobile devices corresponding to the respective potential virtual game participants are able to engage in handshaking. For example, FIG. 1 shows that mobile device E is beyond the radio frequency protocol range of mobile device B, and therefore mobile device B is unable to engage in handshaking with mobile device E. Similarly, mobile devices D and E are unable to engage in handshaking with each other. Each of the requested mobile devices B through E then transmit to requesting mobile device A the identification of the other requested mobile devices with which the respective requested mobile device was able to complete handshaking processing.

Accordingly, since a virtual game implemented by a radio frequency protocol requires that the respective mobile devices of all participants be within a common radio frequency protocol range, the example of FIG. 1 results in only the users of mobile devices A through D being within a common radio frequency protocol range and thus, only the users of such mobile devices are able to participate in the virtual game. The user of mobile device E is unable to participate since mobile device E is beyond the radio frequency protocol range of mobile devices B and D.

Figure 2:
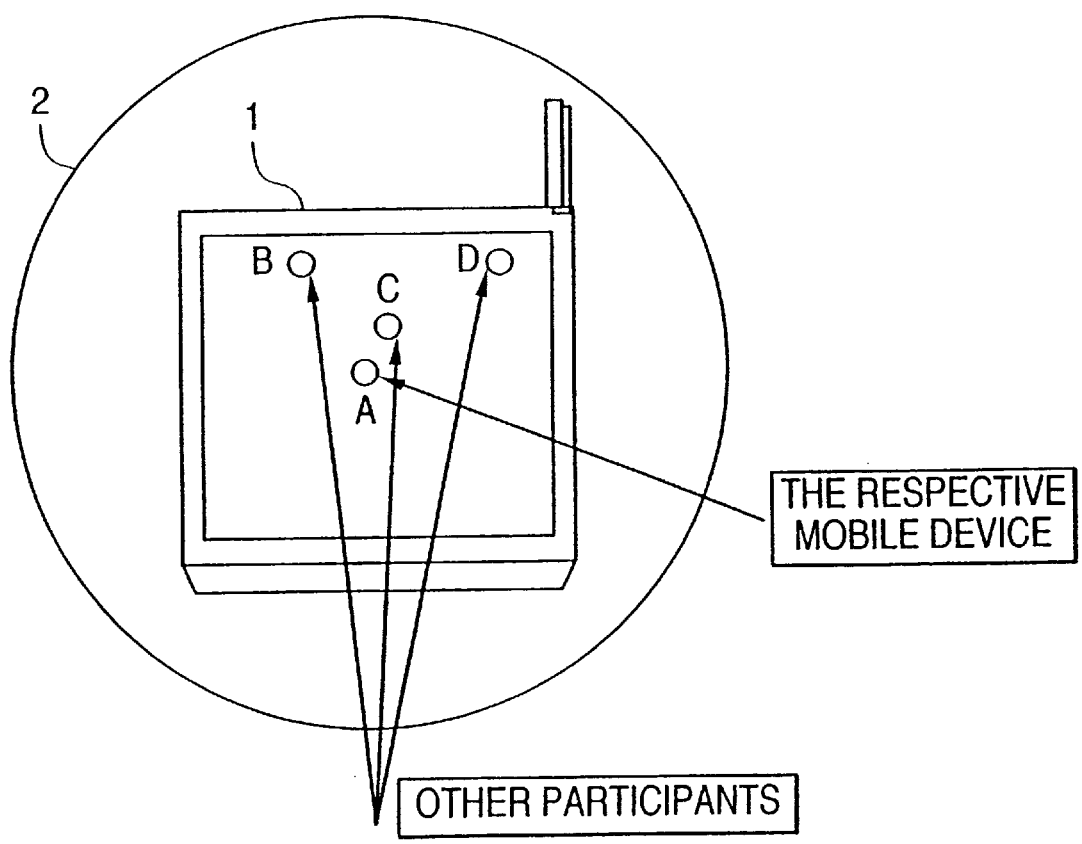
FIG. 2 shows a mobile device with the relative GPS coordinates of mobile devices participating in the virtual game displayed thereon.

The requesting mobile device A then identifies the mobile devices B through D which will participate in the virtual game and displays the relative positions of all participating mobile devices A through D on the display screen of the mobile device A, as shown in FIG. 2. Similarly, when mobile device A has transmitted the identity and GPS coordinates of all participating mobile devices B through D to each other, each of mobile devices B through D will also display the relative positions of all of the participating mobile devices A through D, with each respective mobile device being represented in the middle of the respective display. That is, mobile device A will display the positions of all participating mobile devices A through D relative to itself, mobile device A, with the respective mobile device A being represented in the middle of the display, as shown in FIG. 2, and likewise for mobile devices B through D.

The virtual game itself is played then among the users of participating mobile devices A through D. Each of the mobile devices includes an application program to facilitate the game and a motion sensor to implement to physical movements of the virtual game.

Figure 3:
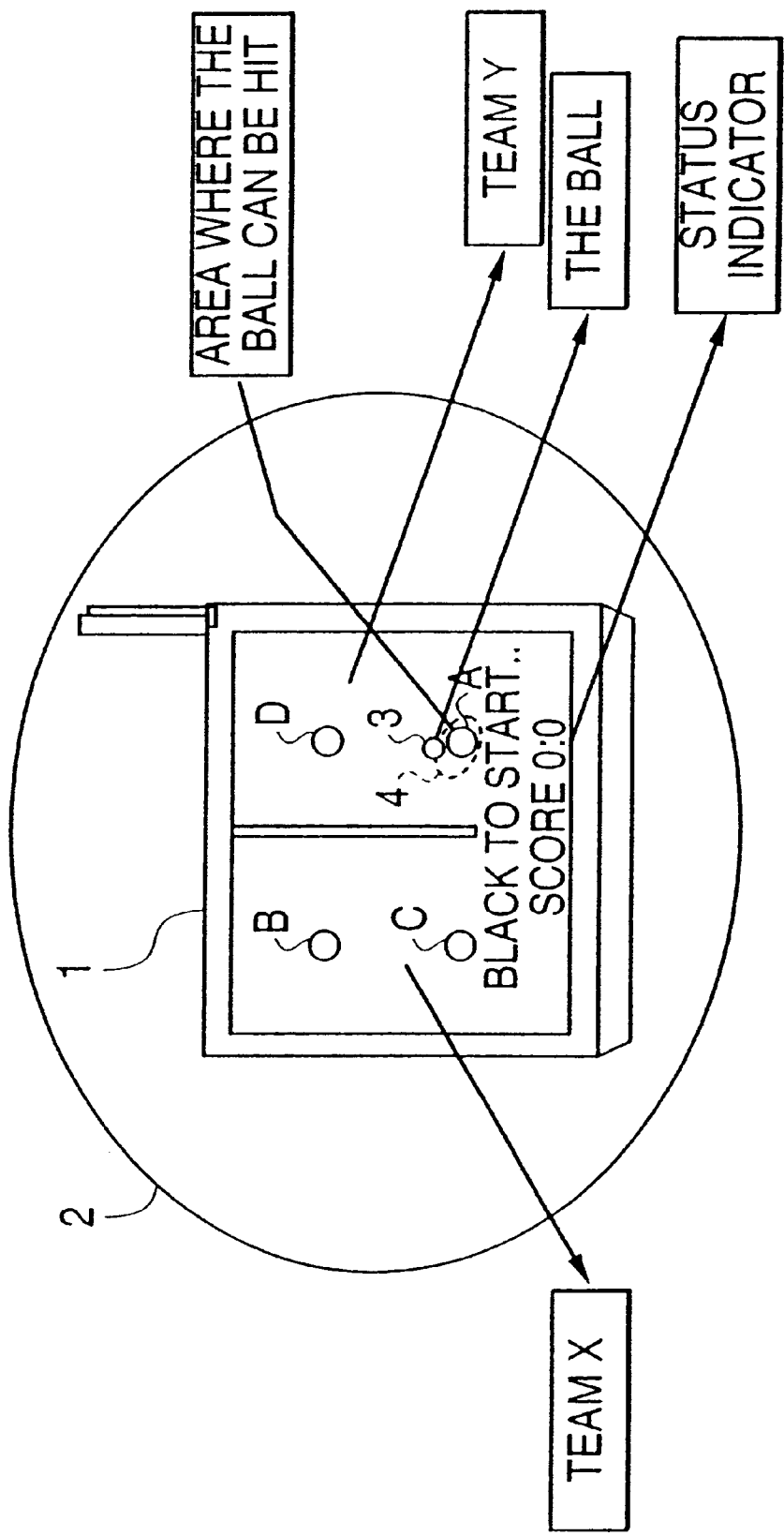
FIG. 3 shows a mobile device set up for playing a virtual game with participating mobile devices displayed thereon.

As an example, FIG. 3 shows the a virtual game of volleyball with Team X with the users of participating mobile devices B and C playing against Team Y with the users of participating mobile devices A and D. The application program for the virtual game of volleyball, as well as for a variety of other virtual games, is stored in each of the participating mobile devices A through D, and the players are divided into Teams X and Y, respectively, by choice.

Accordingly, the mobile device display for all participating mobile devices will show the game set-up as shown in FIG. 3, even though the players, who are the users of participating mobile devices A through D, are randomly located throughout the radio frequency protocol frequency range.

Figure 5:
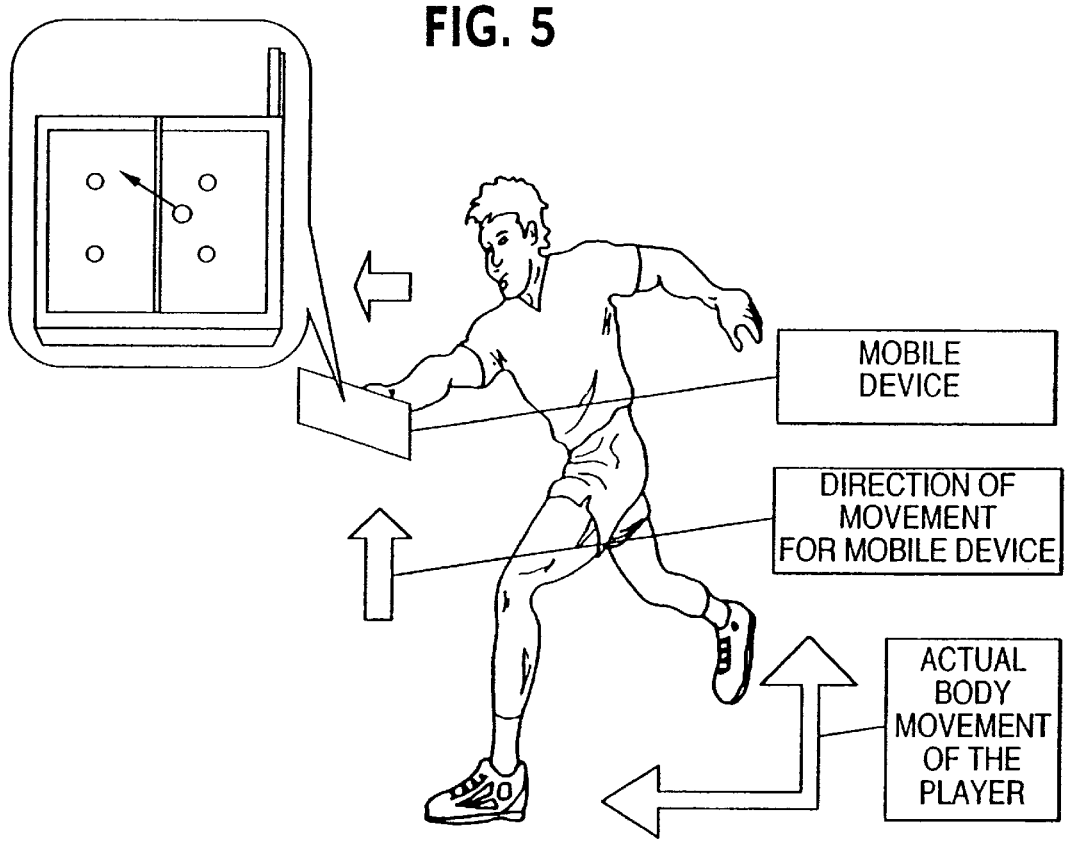
FIG. 5 shows a user of a mobile device participating in the virtual game.

FIG. 5 shows one of the participating users of mobile devices A through D, holding the respective mobile device in his hand. Each of the mobile devices A through D has a motion sensor stored therein which calculates the displacement of the virtual objects. Thus, assuming that the player shown in FIG. 5 is the user of mobile device A, as the ball 3 approaches the area 4 where the ball can be hit as shown in FIG. 3, the player swings the mobile device A so as to "contact" the virtual volleyball and send it over the net. The motion sensor in mobile device A then calculates the displacement of the virtual volleyball based on the trajectory and velocity of the sensed motion of the mobile device. The displacement of the virtual volleyball is then displayed as shown on the mobile device 1 shown in FIG. 5 for all participants in the virtual game, and the game proceeds with all users of mobile devices A through D using their respective mobile devices to engage in the virtual volleyball game.

Figure 4:
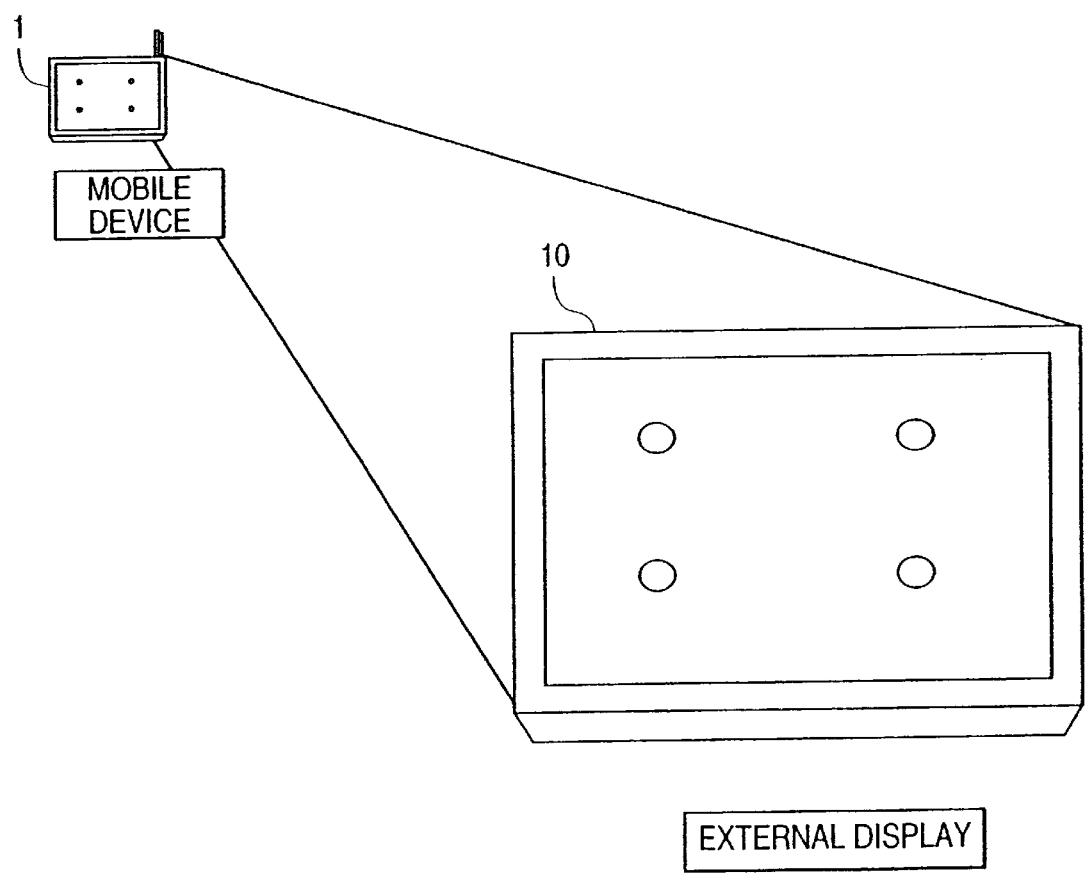
FIG. 4 shows a mobile device participating in the virtual game and its wireless connection to a corresponding external display device.

Furthermore, because the physical movements required for playing the virtual game are the same as those required for playing an actual game, it is not always convenient for the participating players to hold their respective mobile devices so that they can see the virtual game shown on the display of the mobile device. So, as shown in FIG. 4, the display of the respective mobile devices 1 can each be displayed on one or more external display units. For instance, the mobile device 1 can transmit its display to the external display 10 utilizing a radio frequency protocol, including the Bluetooth protocol, or have a wired transmission thereto. The external display 10 can be a television monitor, computer monitor or even arcade-type virtual reality goggles.

The virtual game can also be implemented utilizing a wireless application protocol (WAP), which is a data packet network including, but not limited to, the internet.

According to the implementation of the virtual game utilizing a WAP, there are no range limits which would restrict the eligibility of participants. Thus, the requesting mobile device A is able to initiate handshaking with any other desired mobile device by sending initiation signals over the WAP network, as shown in FIG. 6.

Figure 6:
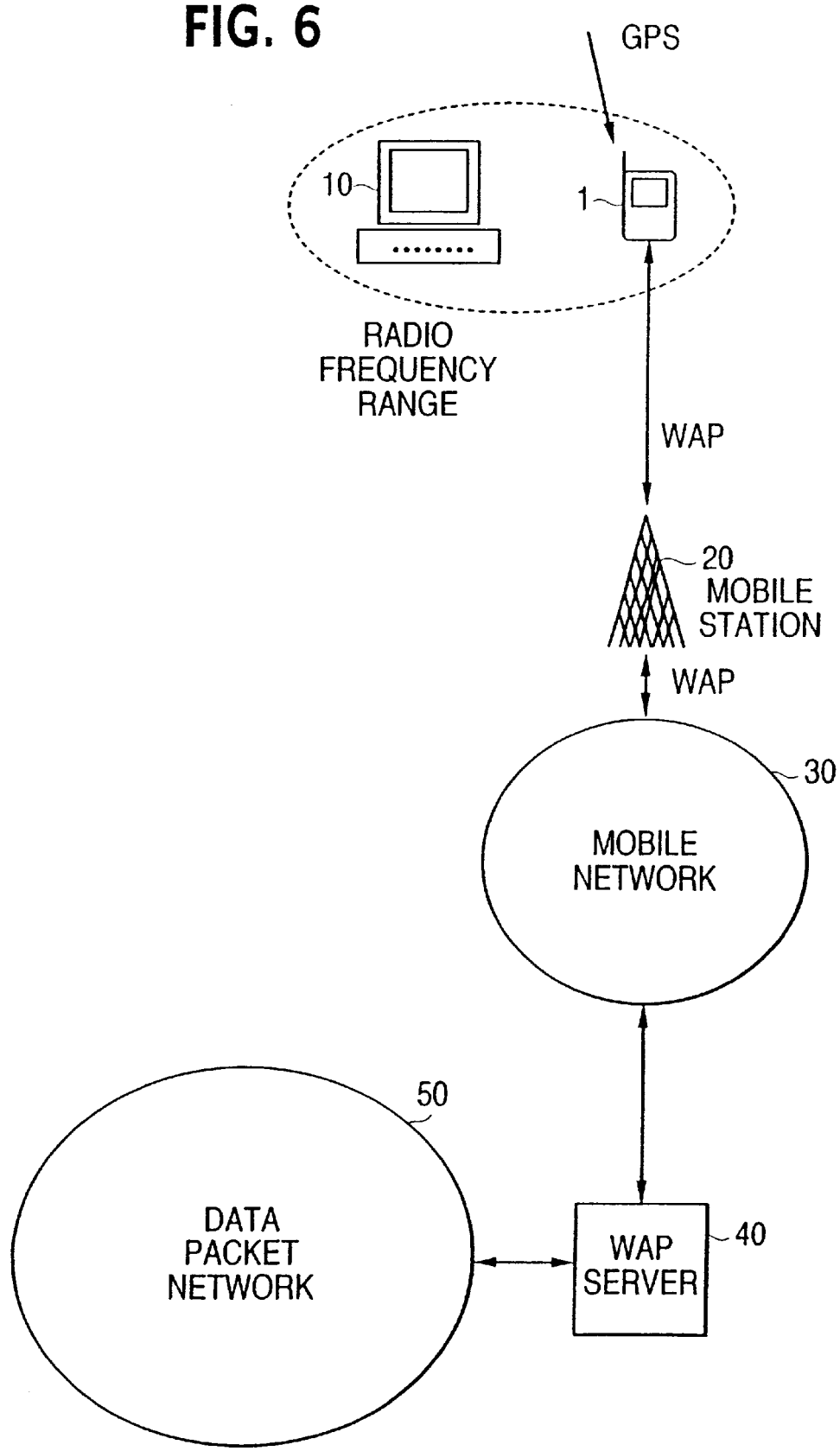
FIG. 6 shows a WAP system utilized for implementing a virtual game according to the invention.

Specifically, as shown in FIG. 6, requesting mobile device 1 transmits an initiation signal utilizing a WAP to mobile station 20, which serves as a WAP relay to mobile network 20. The initiation signal is then transmitted to WAP server 40 for distribution over a data packet network 50. The requested mobile devices are similarly connected to the data packet network, and therefore transmit their respective GPS coordinates and participation acknowledgment signals to the requesting mobile device using the same protocol and procedures that the initiating signal is sent from the requesting mobile device.

Unlike the virtual game implemented utilizing the radio frequency protocol, the virtual game implemented utilizing the WAP allows any and all requested mobile devices that transmit their respective GPS coordinates and participation acknowledgment signals to the requesting mobile unit to participate in the virtual game. Thus, after the desiring users of the requested mobile devices transmit their respective GPS coordinates and participation acknowledgment signals to the requesting mobile unit, the requesting mobile unit transmits the GPS coordinates of all participating mobile devices to the remainder of the mobile devices.

Then, as depicted in FIG. 2, each of the mobile devices 1 will then display the positions of all of the participating mobile devices relative to itself, that is, with the respective mobile device being displayed as the central device.

The virtual game is then played out as shown in FIGS. 3 and 5, as described above. Each of the users of the participating mobile devices use the motion sensing mobile devices to interact with each other as shown in FIG. 5, and the game is displayed on the display portion of the respective mobile devices as shown in FIG. 3. Also, as shown in FIG. 4 described above, the participating mobile device users can display the interactive virtual game on an external display 10.

While the present invention has been described in detail and pictorially in the accompanying drawings, it is not limited to such details since many changes and modifications may be made thereto without departing from the spirit and scope of the present invention. It is intended that all such modifications fall within the scope of the following claims.

I claim:

1. A method for virtual interaction among a plurality of participants having mobile devices, said method comprising the steps of:

transmitting a request for participation acknowledgment data and positioning system position coordinates from a requesting mobile device to potential participating mobile devices;

transmitting participation acknowledgment data and position coordinates from said potential participating mobile devices to said requesting mobile device;

calculating, by said requesting mobile device, relative positions of all of said potential participating mobile is devices which transmit participation acknowledgment data and position coordinates;

identifying all participating mobile devices;

displaying the position of all of said participating mobile devices; and virtually interacting, utilizing a virtual application program, among said participating mobile devices.

2. A method according to claim 1, wherein said requesting mobile device transmits said request for participation acknowledgment data and position coordinates to potential participating mobile devices within a radio frequency range of said requesting mobile device in accordance with a radio frequency protocol.

3. A method according to claim 2, wherein said radio frequency protocol is a Bluetooth radio frequency protocol.

4. A method according to claim 2, wherein said step of identifying said participating mobile devices includes the sub-steps of:

identifying the position coordinates, by said requesting mobile device, of all of said potential participating mobile devices which transmitted participation acknowledgment data and position coordinates to said requesting mobile device to the others of said potential participating mobile devices which transmitted participation acknowledgment data and position coordinates to said requesting mobile device;

each of said identified potential participating mobile devices performing handshaking processing with the others of said identified potential participating mobile devices;

each of said identified potential participating mobile devices transmitting to said requesting mobile device identification information of those of said identified potential participating mobile devices with which said handshaking processing was completed; and said requesting mobile device identifying said participating mobile devices as being those of said identified potential participating mobile devices which complete said handshaking processing with each other.

5. A method according to claim 4, wherein said requesting mobile device only displays the position of said participating mobile devices.

6. A method according to claim 5, wherein said virtual interaction is performed among all of said participating mobile devices which are within the common, permissible radio frequency protocol range of each other.

7. A method according to claim 5, wherein all of said participating mobile devices which are within the common, permissible radio frequency range of said requesting mobile device and each other perform a further step of displaying the relative positions of all of said participating mobile devices.

8. A method according to claim 1, wherein each of said mobile devices includes a motion sensor and an application program to facilitate said step of virtually interacting.

9. A method according to claim 1, wherein said requesting mobile device transmits said request for participation acknowledgment data and position coordinates to potential participating mobile devices utilizing a wireless application protocol (WAP).

10. A method according to claim 9, wherein said WAP is running on a data packet network.

11. A method according to claim 9, wherein said requesting mobile device transmits said request for participation acknowledgment and position coordinates via a processor which is connected to a WAP server.

12. A method according to claim 11, wherein said requesting mobile device transmits said request to said processor utilizing a radio frequency protocol.

13. A method according to claim 12, wherein said radio frequency protocol is a Bluetooth radio frequency protocol.

14. A method according to claim 9, wherein said requesting mobile device transmits said request to an application server.

15. A method according to claim 9, wherein said potential participating mobile devices transmit said participation acknowledgment data and position coordinates to a WAP server.

16. A method according to claim 15, wherein said potential participating mobile devices transmit said participation acknowledgment data and position coordinates to said respective processors utilizing a radio frequency protocol.

17. A method according to claim 16, wherein said radio frequency is a Bluetooth radio frequency protocol.

18. A method according to claim 9, wherein said potential participating mobile devices transmit said participation acknowledgment data and position coordinates to a WAP server.

19. A method according to claim 1, wherein said participating mobile devices transmit a display of said virtual interaction to an external display device.

20. A method according to claim 19, wherein said external display device includes any of a television monitor, a computer monitor and a virtual reality headset.

21. A method according to claim 19, wherein said participating mobile devices transmit the display of said virtual interaction to said external display device utilizing a radio frequency protocol.

22. A method according to claim 21, wherein said radio frequency protocol is a Bluetooth protocol.

23. A method according to claim 21, wherein said radio frequency protocol is a home RF protocol.

24. A method according to claim 14, wherein application server is a WAP server.

25. A method according to claim 1, wherein said step of virtually interacting among said participating mobile devices includes playing a virtual game.

26. A method according to claim 1, wherein said positioning system is a Global Positioning System (GPS).

* * * * *